(12) United States Patent
Tobe et al.

(10) Patent No.: US 8,234,708 B2
(45) Date of Patent: Jul. 31, 2012

(54) INFORMATION PROCESSING DEVICE AND MEMORY MANAGEMENT METHOD

(75) Inventors: Akiko Tobe, Yokosuka (JP); Masayuki Tsuda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 320 days.

(21) Appl. No.: 12/582,884

(22) Filed: Oct. 21, 2009

(65) Prior Publication Data

US 2010/0107216 A1    Apr. 29, 2010

(30) Foreign Application Priority Data

Oct. 23, 2008  (JP) ................................ P2008-273452

(51) Int. Cl.
| G06F 11/00 | (2006.01) |
| G06F 12/00 | (2006.01) |
| G06F 12/14 | (2006.01) |
| G06F 13/00 | (2006.01) |
| G06F 13/28 | (2006.01) |
| G08B 23/00 | (2006.01) |
| H04L 29/06 | (2006.01) |
| G06F 15/173 | (2006.01) |

(52) U.S. Cl. .......... 726/23; 713/151; 713/152; 713/188; 709/224; 711/100

(58) Field of Classification Search .......... 711/170–173, 711/100; 726/22–24; 713/151–152, 188; 709/224

See application file for complete search history.

(56) References Cited

U.S. PATENT DOCUMENTS

| 4,811,216 | A  | * | 3/1989  | Bishop et al. ................ 711/153 |
| 6,735,770 | B1 | * | 5/2004  | Yeager et al. ................ 718/107 |
| 7,039,801 | B2 | * | 5/2006  | Narin ............................ 713/152 |
| 7,484,247 | B2 | * | 1/2009  | Rozman et al. ................ 726/34 |
| 7,650,493 | B2 | * | 1/2010  | Narin ............................ 713/152 |
| 7,721,064 | B1 | * | 5/2010  | Lam et al. ..................... 711/170 |
| 7,757,291 | B2 | * | 7/2010  | Rochette et al. ............... 726/24 |
| 2002/0002673 | A1 | * | 1/2002  | Narin ............................ 713/152 |
| 2002/0053011 | A1 |   | 5/2002  | Aiken et al. |
| 2003/0101292 | A1 | * | 5/2003  | Fisher et al. .................. 709/328 |
| 2004/0210546 | A1 | * | 10/2004 | Spooner et al. ................ 706/45 |
| 2005/0021917 | A1 |   | 1/2005  | Mathur et al. |

(Continued)

FOREIGN PATENT DOCUMENTS

JP    63-59628    3/1988

(Continued)

OTHER PUBLICATIONS

Office Action issued Nov. 9, 2010, in Japan Patent Application No. P2008-273452 (with English translation).

(Continued)

*Primary Examiner* — Christian Laforgia
(74) *Attorney, Agent, or Firm* — Oblon, Spivak, McClelland, Maier & Neustadt, L.L.P.

(57) ABSTRACT

It is an object of the present invention to provide an information processing device and a memory management method that enable execution of memory management processing for simultaneously starting up two types of applications. During execution of an application in the form of a Java application, the application starts up another an application in the form of Flash data, and then a native software in the form of a Flash Player causes a memory management unit to secures a prescribed memory area from a memory area for the native software. A native software then starts up the other application using the secured memory area.

5 Claims, 6 Drawing Sheets

U.S. PATENT DOCUMENTS

| | | | | |
|---|---|---|---|---|
| 2007/0055841 | A1* | 3/2007 | Jansen et al. | 711/170 |
| 2008/0077922 | A1* | 3/2008 | Doring | 718/100 |

FOREIGN PATENT DOCUMENTS

| | | |
|---|---|---|
| JP | 7-84883 | 3/1995 |
| JP | 7-225694 | 8/1995 |
| JP | 8-305589 | 11/1996 |
| JP | 2000-99342 | 4/2000 |
| JP | 2004-127280 | 4/2004 |
| JP | 2004-304725 | 10/2004 |
| JP | 2005-10838 | 1/2005 |
| JP | 2005-284906 | 10/2005 |
| JP | 2006-107197 | 4/2006 |
| JP | 2008-7725 | 1/2008 |
| WO | WO 2006/051454 A1 | 5/2006 |

OTHER PUBLICATIONS

James Noble, et al., "Proceedings of the Memory Preservation Society", Proceeding of the Memory Preservation Society, Patterns for Managing Limited Memory, XP002370233, Sep. 13, 1998, pp. 1-32.

Hotshot, Robartes et al., "Killing Child Process", PerlMonks, XP002577484, Oct. 12, 2003, pp. 1-5.

Chinese Office Action dated May 4, 2012, in corresponding patent application 200910205396.2.

\* cited by examiner

Fig.3

| STARTED APPLICATION | SECURED MEMORY SPACE |
|---|---|
| NATIVE SOFTWARE A | 0000−3000 |
| APPLICATION A | 0500−1FFF |
| NATIVE SOFTWARE B | 2000−3000 |
| APPLICATION B | 2500−2AAA |

INFORMATION PROCESSING DEVICE AND MEMORY MANAGEMENT METHOD

BACKGROUND OF THE INVENTION

1. Field of the Invention

The present invention relates to an information processing device that executes an application, and a memory management method for that application.

2. Related Background Art

In general, in the case of starting up an application, a memory management unit secures in memory a memory area for deploying the application. For example, in the technology described in Japanese Patent Application Laid-open No. 2006-107197, it is described that when a memory acquisition unit receives a memory acquisition request from an application, the memory acquisition unit checks whether request amount of memory can be secured, and then carries out processing to secure that memory when possible.

SUMMARY OF THE INVENTION

In the invention described in the related background art above, although the invention presumes that a single application has been started up, in actuality there are cases in which two types of applications may be executed simultaneously. Namely, in the case an application A is started up, a native software A that established an execution environment, is loaded into memory. A native software B is then loaded into memory by a request from the application A. The native software B typically secures memory area that is separate from the memory area secured by the native software A.

However, in the case of a small amount of remaining memory capacity, there may be cases in which the application B cannot be started up since storage memory is unable to be secured for the native software B. In addition, in a different method, it was necessary to release memory area for the application B by terminating the application A in order to start up the application B.

Thus, depending on memory capacity, there are times in which it is not possible to simultaneously start up two types of applications, thereby resulting in extremely poor ease of use.

Therefore, in order to solve these problems, an object of the present invention is to provide an information processing device and a memory management method that enable memory management processing to be executed for simultaneously starting up two types of applications.

In order to solve the above-mentioned problems, the information processing device of the present invention includes: a first program for executing a first function; a second program for executing a second function; a memory having a memory area for executing operation of the first program and the second program; and memory management unit for securing a prescribed memory area for operation by the first program or the second program from the memory, wherein the memory management unit is configured such that the memory area for the second program is secured from a memory area for the first program when the second program is started up during operation processing by the first program.

In addition, the memory management method of the present invention is a memory management method for an information processing device provided with memory having a memory area for executing a first program that executes a first function and a second program that executes a second function, the method including a first securing step of securing a prescribed memory area for operation by the first program from the memory; and a second securing step of securing a memory area for the second program from the memory area for the first program when the second program is started up during operation processing by the first program.

According to this invention, when a second program is started up during operation processing by a first program, memory area for the second program can be secured from memory area for the first program. As a result, in the case of attempting to start up a plurality of applications such as the first program and second program, the inability to start up the applications due to insufficient available memory area can be prevented, thereby making it possible to realize reliable startup of the second program.

In addition, the information processing device of the present invention is preferably further provided with application management unit for terminating operation of the second program when the first program finishes operating.

According to this invention, operation of the second program can be terminated when the first program finishes operating, thereby making it possible to enhance memory utilization efficiency without occupying memory area for the second program.

In addition, the information processing device of the present invention is preferably provided with security policy determination unit for determining whether or not a security policy of the first program is satisfied when the second program operates, and in a case where the security policy is determined to not be satisfied according to a result of the determination by the security policy determination unit, the second program terminates the processing.

According to this invention, in the case it has been determined that a second program does not satisfy a security policy according to the results of that determination, processing by the second program can be terminated. Accordingly, the startup of applications not satisfying a security policy can be prevented. In particular, when an application 106 starts up according to the instructions of an application 101, the application 106 is requested to operate while satisfying a security policy of the application 101. According to this invention, execution of a second program in violation of the security policy of a first program can be prevented in advance.

The present invention is able to prevent any application from being unable to be started up due to a shortage of available memory area in the case of attempting to start up a plurality of applications, thereby making it possible to realize reliable application startup. In addition, a plurality of applications having different security policies can be operated in accordance with a single security policy.

BRIEF DESCRIPTION OF THE DRAWINGS

FIG. 3 is an explanatory drawing for managing memory area in a memory management unit 110;

DESCRIPTION OF THE PREFERRED EMBODIMENTS

The following provides an explanation of embodiments of the present invention with reference to the appended drawings. When possible, the same reference symbols are used to represent the same constituents, and repeated explanations thereof are omitted.

Figure 1:
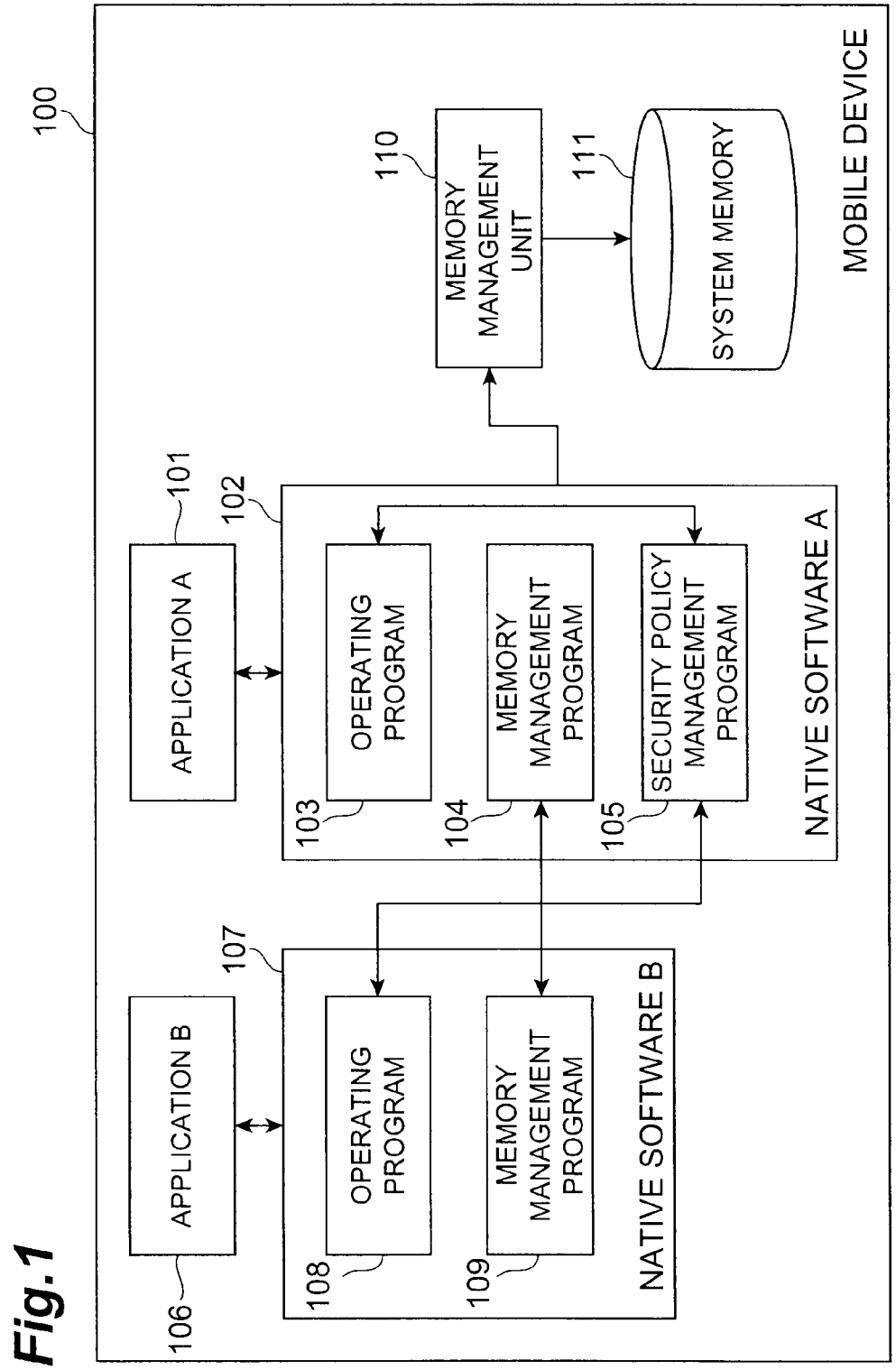
FIG. 1 is a block diagram showing the function configuration of a mobile device 100 of the present embodiment.

FIG. 1 is a block diagram showing the function configuration of a mobile device 100 of the present embodiment. As shown in FIG. 1, the mobile device 100 includes an application 101 (application A), a native software 102 (native software A: including an operating program 103, a memory management program 104, and a security policy management program 105 (security policy determination unit)), an application 106 (application B), a native software 107 (native software B (application management unit): including an operating program 108 and a memory management program 109), a memory management unit 110 (memory management unit) and a system memory 111. The application 101 and the native software 102 may be collectively referred to as a first program, while the application 106 and the native software 107 may be collectively referred to as a second program as necessary. The mobile device 100 configured in this manner is realized by the hardware configuration shown in FIG. 2.

Figure 2:
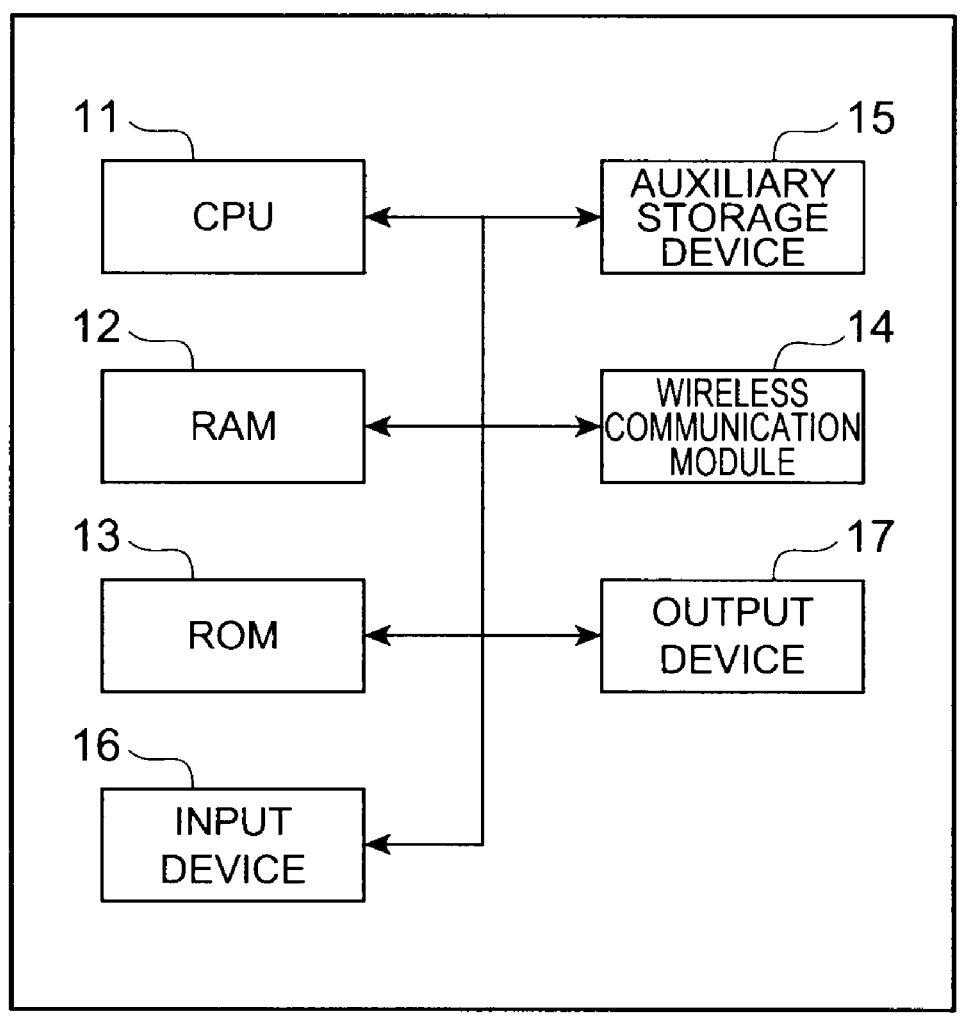
FIG. 2 is a hardware block diagram of the mobile device 100.

FIG. 2 is a hardware block diagram of the mobile device 100. As shown in FIG. 2, the mobile device 100 shown in FIG. 1 is physically composed in the form of a computer system containing a CPU 11, main storage devices in the form of a RAM 12 and a ROM 13, an input device such as a keyboard or mouse in the form of an input device 14, an output device 15 such as display, a data transmission/reception device such as a network card in the form of a communication module 16 and an auxiliary storage device 17 such as a hard disc. Each function explained in FIG. 1 is realized by reading and writing data in the RAM 12 and the auxiliary storage device 17 together with operating the input device 14, the output device 15 and the communication module 16 under the control of the CPU 11 by installing a prescribed computer software in hardware such as the CPU 11 or RAM 12 shown in FIG. 2. The following provides an explanation of each function block based on the function blocks shown in FIG. 1.

The application 101 is an application for executing a prescribed function, and is, for example, a Java application executed in a Java environment. Furthermore, this application 101 retains a memory area as a default value that is required by an application executed by the application 101 such as the application 106. Furthermore, the application 101 and the application 106 are premised on being created by the same software company, and there is significance in retaining memory area required by the application 101. For example, as previously described, in the case the application 101 is a game application and the application 106 is flash data (This data is processed by Adobe Flash Player®) manipulated in that game, as a result of the game application retaining memory area required by the flash data, reliable manipulation of the flash data can be executed.

The memory management program 104 and the memory management unit 110 to be described later are able to retain memory area in the system memory 111 by using the default value (memory area) retained in this application 101.

The native software 102 is a platform (application or program language) that provides an execution environment for executing the application 101, and is, for example, a Java runtime environment. This native software 102 comprises the operating program 103, the memory management program 104 and the security policy management program 105. The following provides a more detailed explanation thereof.

The operating program 103 is a program for operating the application 101.

The memory management program 104 is a portion that carries out memory management of the application 101, and more specifically, is a program that manages memory area of the system memory 111 used by the application 101. Namely, the memory management program 104 determines whether or not there is a shortage of available memory area for the application 101, and if that memory area is determined to be insufficient, instructs the memory management unit 110 to secure new memory area for allocating an amount of memory corresponding to that shortage from memory area secured for the native software 102 in the system memory 111.

The security policy management program 105 is a program that manages a security policy of the native software 102, and more specifically, is a portion that stores a destination permitted to be accessed in the case of a communication, determines the validity of that access, and stores volume data indicating a volume in playing music and the like that can be accessed by the native software 102 so that the volume does not become greater than what is necessary.

The application 106 is an application for executing a prescribed function, and for example, is data processed by Flash Player developed by Adobe Systems Inc. In the present embodiment, this data is referred to as an application since it is written and processed in script.

The native software 107 is an application for providing an execution environment for executing the application 106, and is, for example, Flash Player developed by Adobe Systems Inc.

The operating program 108 is a program for operating and executing the application 106 (data).

The memory management program 109 determines whether or not there is a shortage of available memory area for the application 106, and if that memory area is determined to be insufficient, outputs instructions to the memory management program 104 (memory management unit 110) to secure required memory area from the system memory 111.

The memory management unit 110 is a portion that carries processing for securing memory area for operation of the native software 102, the native software 107, the application 101 and the application 106 from the system memory 111 according to instructions from the native software 102. More specifically, when the memory management unit 110 receives instructions to carry out processing for securing memory area for the native software 102 and the application 101 as well as secure memory area for the application 106 from the native software 102, it carries out memory acquisition processing by extracting memory area for the native software 107 and the application 106 from previously secured memory area for the application 101.

FIG. 3 shows an explanatory drawing for management of memory area in the memory management unit 110. As shown in FIG. 3, the memory management unit 110 manages memory area by storing secured area that is secured for the native software 102, the native software 107, the application 101 and the application 106, so that the secured areas are specifiable. In the example of FIG. 3, secured area of the native software A in the form of the native software 102 is managed as 0000 to 3000, while the secured area of the application 101 is managed as 0500 to 1FFF. In addition, secured area of the native software B in the form of the native software 107 is managed as 2000 to 3000, while the secured area of the application 106 executed in the execution environment of the native software 107 is managed as 2500 to 2AAA.

The system memory 111 is a memory having memory area for operation of the application 101 and the application 106.

Figure 4:
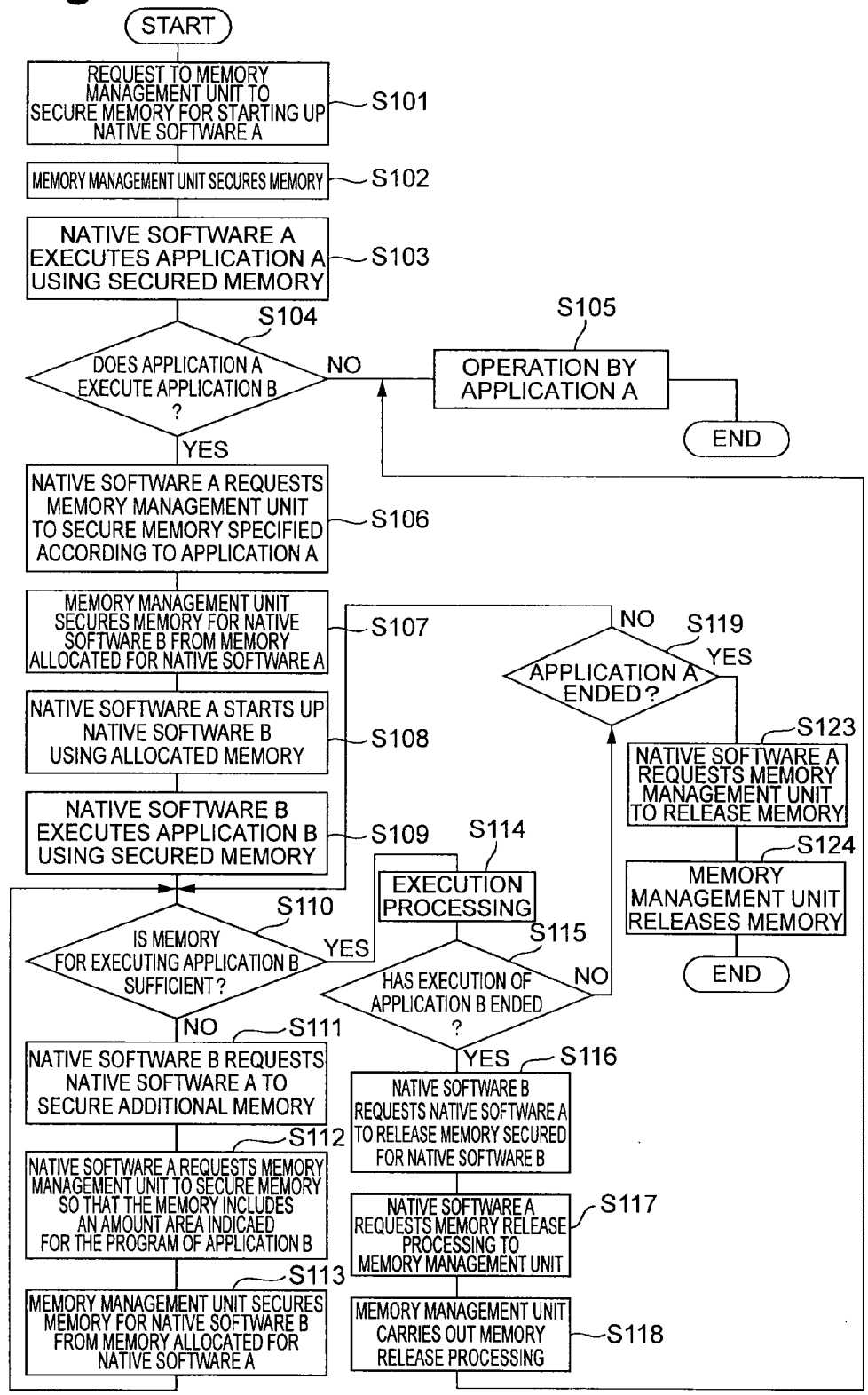
FIG. 4 is a flow chart showing the operation of the mobile device 100.

Next, an explanation is provided of the operation of the mobile device 100 composed in this manner. FIG. 4 is a flow chart illustrating the operation of the mobile device 100.

First, a request is made to the memory management unit 110 by, for example, an operating system (OS) that carries out application management so as to secure memory area in the system memory 111 for starting up the native software 102 (native software A) and the application 101 (application A) (S101). The secured memory area is defined according to the native software.

A prescribed memory area is then secured in the system memory 111 by the memory management unit 110 (S102), the application 101 is executed by the native software 102 using the secured memory area (S103).

Next, during operation execution by the application 101, a determination is made by the application 101 as to whether or not the application 106 is started up according to processing by that application 101 (S104). Here, if the application 106 is determined to not be executed, only the application 101 is operated and executed (S105).

If it has been determined in S104 that the application 101 (application A) has started up the application 106 (application B), instructions are output to the memory management unit 110 by the native software 102 so as to secure a pre-specified memory area corresponding to the application 101, namely memory area in the system memory 111 that is retained as a default value retained in the application 101 (S106). Memory area able to be used by the native software 107 (software B) is then secured from memory area allocated to the native software 102 by the memory management unit 110 (S107).

The allocated memory area is then used by the native software 102, the native software 107 is started up (S108), and execution of the application 106 is started by the native software 107 using the secured memory area (S109).

Here, a determination is made by the memory management program 109 as to whether or not memory area required for execution of the application 106 is sufficient (S110).

If memory area is judged to be insufficient, instructions are output to the native software 102 by the native software 107 so as to secure additional memory area (S111). Instructions are then output to the memory management unit 110 by the native software 102 so as to secure memory area in the system memory 111 for the native software 107 (S112). In the memory management unit 110, memory area able to be used by the native software 107 is secured from the memory area allocated for the native software 102 in the system memory 111 (S113). Steps S110 to S113 are repeated until memory area enabling execution of the application 106 is able to be secured.

In addition, if memory area for executing the application 106 is determined to be sufficient in S110 (Yes in S110), the application 106 is executed by the native software 107 (S114). Furthermore, a check of the security policy is made when the application 106 is executed. The details of this processing are described later.

Next, when the application 106 is executed and processed, a determination is made of the execution status of the application 106 (S115). Here, when it has been determined by the native software 107 that the application 106 has terminated, instructions are output to the native software 102 from the native software 107 so as to release memory area secured for the native software 107 (S116).

When these instructions are received, in the native software 102, memory area release processing is instructed to the memory management unit 110 (S117), and memory area release processing is carried out by the memory management unit 110 (S118).

In addition, in S115, if it is determined by the native software 107 that execution of the application 106 have not terminated (No in S115), a determination is made by the native software 102 as to whether or not execution of the application 101 has terminated (S119). Here, if it has been determined that execution of the application 101 has not terminated, together with processing returning to S110 and execution of the application 106 continuing, a judgment is continued to be made as to whether or not there is a shortage of memory area for the application 106 and whether or not operation of the application 106 has terminated.

If execution of the application 101 has been determined to have terminated in S119, and memory area release processing for the application 106 is carried out by the memory management unit 110 based on instructions from the native software 102, memory area release processing for the application 101 is carried out. More specifically, instructions to carry out memory area release processing are output to the memory management unit 110 by the native software 102 (S123). Memory area cancellation processing for the application 101 is then carried out by the memory management unit 110 (S124).

As a result of this processing, processing for securing memory area for the application 106 from memory area for the application 101 is carried out in the system memory 111, thereby the system memory 111 can be utilized efficiently.

Figure 5:
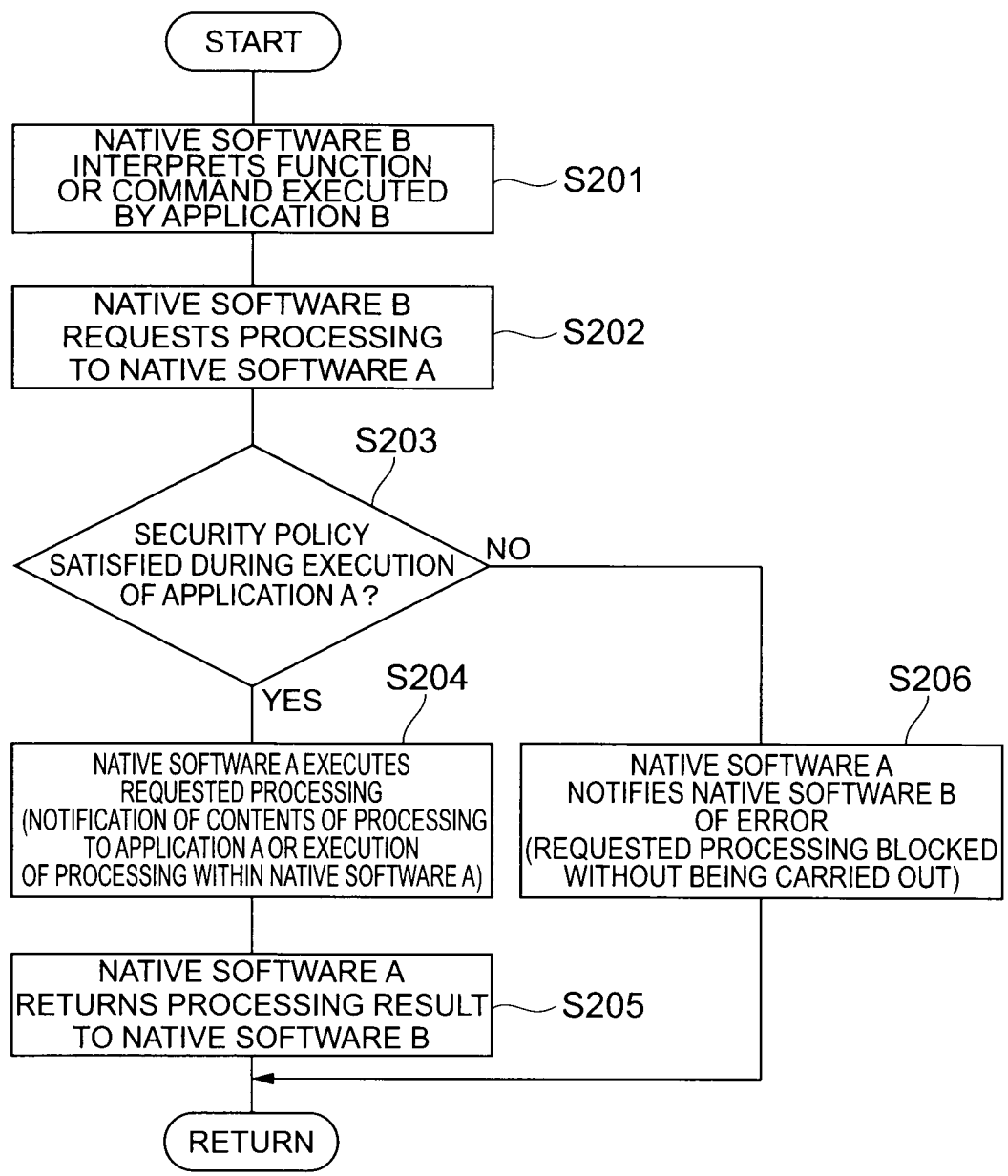
FIG. 5 is a flow chart showing the operation of the mobile device 100 during startup processing of an application that satisfies a security policy.

Next, an explanation is provided of the detailed processing carried out in S114. FIG. 5 is a flow chart of processing that is carried out when a security policy of the native software 102 is satisfied during execution of the application 106 in S114.

First, a function or command executed with the application 106 is interpreted by the native software 107 (S201). In the case it is determined by the native software 107 that the native software 102 has been made to carry out processing based on the interpreted function or command, the native software 102 is requested by the native software 107 to carry out processing based on that function or command (S202).

After having received a request for processing, the native software 102 determines whether or not a security policy during execution of the application 101, namely a predetermined security policy, is satisfied (S203). If the security policy is determined to be satisfied, processing specified with the function or command is executed by the native software 102 (S204). In addition to processing executed by the native software 102, notification of processing contents to the application 101 and the execution of processing by the application 101 are included herein. The results of processing by the native software 102 are notified to the native software 107 (S205).

In addition, in the case the security policy is determined to not be satisfied by the native software 102 in S203 (No in S203), an error notification is made to the native software 107 by the native software 102 (S206).

A check is made of the security policy by such processing, thereby preventing processing that violates the security policy.

Next, a detailed explanation is provided of the manner in which memory area is secured in the system memory 111. FIGS. 6A to 6I are a schematic drawing showing the status transition of securing memory area in the system memory 111.

Figure 6:
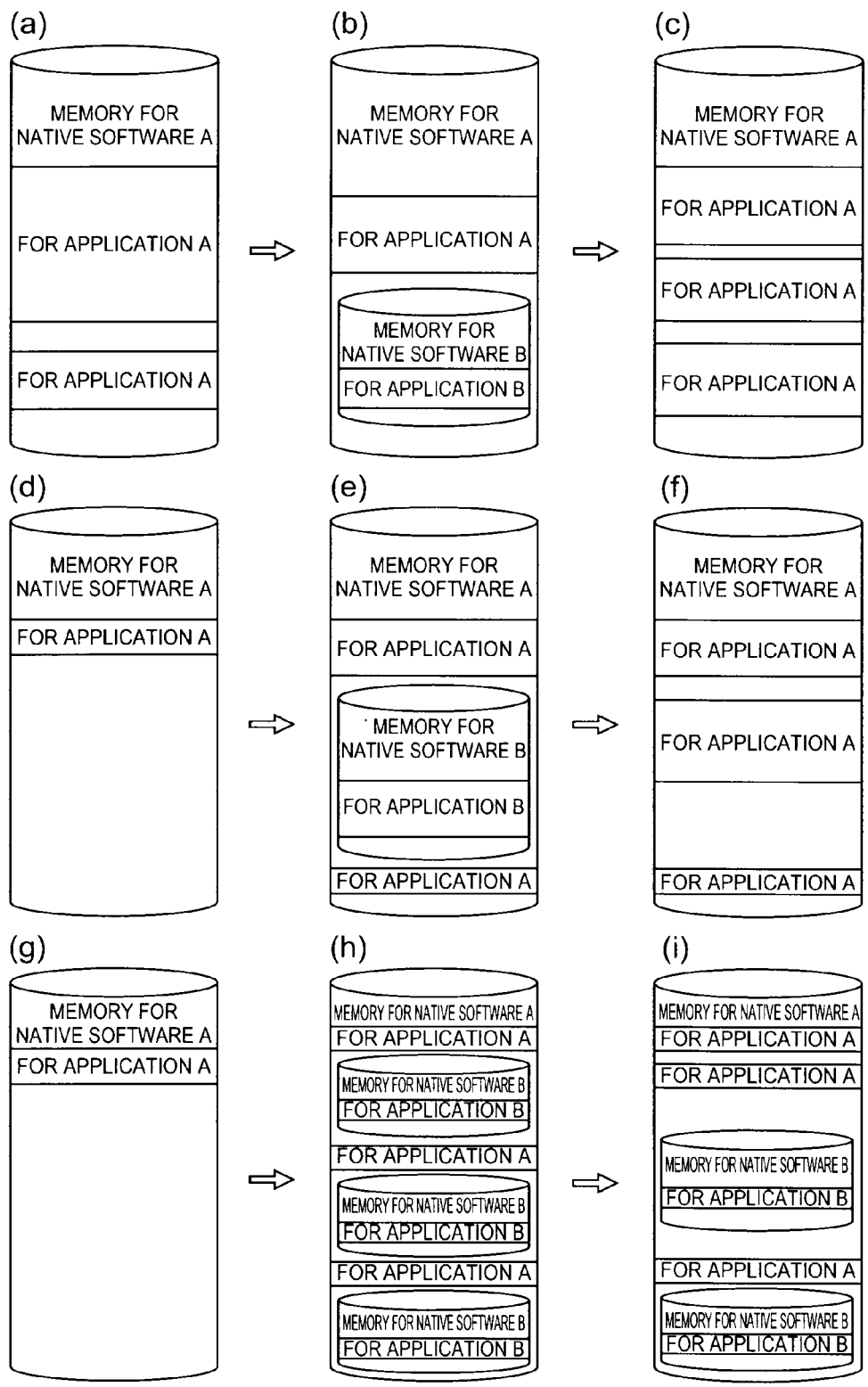
FIGS. 6(*a*) to 6(*i*) are schematic drawings showing the status transition of securing memory area in a system memory 111.

In (a) of FIG. 6, the securing of memory area in the system memory 111 for the native software 102, and the further securing of memory area for the application 101 are depicted. Subsequently, in (b) of FIG. 6, when the application 106 is started up, together with memory area for the application 101 being released by the native software 102, memory area is secured for the application 106. Then, as shown in (c) of FIG.

6, once the application 106 terminates, the memory area thereof is released and memory area for the application 101 is secured.

Next, an explanation is provided of securing memory area in the case the degree of execution of the application 106 is larger than that of the application 101. As shown in (d) of FIG. 6, in the memory area of the native software 102 a smaller amount of memory area for the application 101 may be secured (such as using one-third of the total amount of memory area secured for the application 101) in an attempt to reliably secure memory area for the native software 107. In this manner, by securing a smaller amount of memory area for the application 101, memory area is reliably secured for the native software 107, thereby making it possible to reliably execute the application 106. Furthermore, memory area for the application 106 is secured from memory area secured for the native software 107.

As shown in (e) of FIG. 6, when the native software 107 is started up, a larger amount of memory area can be secured for the native software 107 from the memory area secured for the native software 102. Memory area for the application 106 is then secured from this memory area for the native software 107.

As shown in (f) of FIG. 6, once the application 106 terminates, memory area for the application 106 and memory area for the native software 107 are released, and after this memory area is released, memory area for the application 101 can be secured.

Conversely, in the case the degrees of execution of the application 101 and the application 106 are equal and the usage rates of their memory area changes each time, as shown in (g) of FIG. 6, a predetermined small amount of memory area is used for the application 101. As shown in (h) of FIG. 6, by securing memory area for the native software 107 from the memory area for the native software 102, memory area can be secured in the proper balance for the application 101 and the application 106. As a result of securing a small amount of memory area in this manner, securing and releasing memory area can be carried out in small memory area units each time an application starts up and terminates, and as shown in (i) of FIG. 6, thereby enabling memory area to be secured corresponding to usage status.

Next, an explanation is provided of the action and effects of the mobile device 100 configured in this manner. The mobile device 100 is composed of a first program, composed of a program that provides a Java runtime environment in the form of the native software 102 and an application configured with Java (such as a game application or other Java application), and a second program such as a Flash Player that generates Flash data. In addition, the mobile device 100 is provided with the system memory 111 provided with memory area for executing the first and second programs. Furthermore, although the first and second programs are explained as respectively including a native software and application, their configuration is not limited thereto, but rather a configuration may also be employed such that one of the programs (application or native software) secures memory area for the other program (application of native software), and it is only required that at least native software be included in the programs.

When instructions for execution of the application 101 are received from a user, the memory management unit 110 secures memory area for the native software 102 (Java runtime environment) from the system memory 111, and the native software 102 starts up the application 101 using this secured memory area.

On the other hand, when processing that starts up the application 106 is carried out by the application 101 while execution of that application 101 is in progress, the native software 102 has the memory management unit 110 secure memory area determined according to the application 106, and the memory management unit 110 secures the specified memory area. The native software 107 then starts up the application 106 using that secured memory area.

As a result of employing such a configuration, in the case the application 106 and the native software 107 are attempted to be started up, the inability to start up the application 106 due to a shortage of available memory in the system memory 111 can be prevented, thereby making it possible to realize reliable startup of the application 106.

In addition, in the mobile device 100 of the present embodiment, once operation of the application 106 terminates, the native software 102 terminates operation of the application 106 and the native software 107. As a result, memory area in the system memory 111 is not occupied by the application 106 of the native software 107, thereby making it possible to enhance memory usage efficiency.

In addition, in the mobile device 100 of the present embodiment, when a judgment is made by the security policy management program 105 as to whether or not security policies of the application 101 and the native software 102 are satisfied during operation by the application 101 and the native software 102, and the application 106 and the native software 107 are operating, the security policy management program 105 determines whether or not security policies of both the application 101 and the application 106 are satisfied. In the case it is determined that the security policies are not satisfied according to the result of this determination, the native software 102 terminates startup of the applications 101 and 106.

As a result, startup of an application that does not satisfy a security policy can be prevented. In particular, when the application 106 is started up according to instructions from the application 101 as in the present embodiment, the application 106 is required to operate after having satisfied the security policy of the application 101. In the present embodiment, execution of an application in violation of security policy can be prevented in advance.

What is claimed is:

1. An information processing device, comprising:
a first program that operates in a first native software environment for executing a first function;
a second program that operates in a second native software environment for executing a second function;
a memory having a memory area for executing operation of the first program and the second program; and
memory management unit for securing a prescribed memory area for operation by the first program or the second program from the memory, wherein
the memory management unit secures the memory area for the second program from the memory area for the first program when the second program is started up during operation processing by the first program,
wherein the memory management unit determines whether or not the memory area initially secured for the second program is sufficient for executing the second program, and when the memory area initially secured for the second program is not sufficient the memory management unit requests additional memory from the memory area of the first program.

2. The information processing device according to claim 1, further comprising application management unit for terminating operation of the second program when the first program finishes operating.

3. The information processing device according to claim 1, further comprising security policy determination unit for determining whether or not a security policy of the first program is satisfied when the second program operates, wherein
in a case where the security policy is determined to not be satisfied according to a result of the determination by the security policy determination unit, the second program terminates the processing.

4. A memory management method implemented on an information processing device provided with a memory having a memory area for executing a first program that operates in a first native software environment that executes a first function and a second program that operates in a second native software environment that executes a second function, the method comprising:
a first securing step, by a memory management unit of the information processing device, of securing a prescribed memory area for operation by the first program from the memory; and
a second securing step, by the memory management unit, of securing a memory area for the second program from the memory area for the first program when the second program is started up during operation processing by the first program,
wherein the method further comprises determining, by the memory management unit, whether or not the memory area initially secured for the second program is sufficient for executing the second program, and when the memory area initially secured for the second program is not sufficient, requesting, by the memory management unit, additional memory from the memory area of the first program.

5. The information processing device according to claim 1, wherein the first native software environment is a runtime environment that uses an object-oriented programming language, and the second native software environment is an environment that is activated by the first native software environment and is for executing an application for streaming and playing audio or video data received over the Internet.

* * * * *